United States Patent
Watanabe

(10) Patent No.: US 12,493,955 B2
(45) Date of Patent: Dec. 9, 2025

(54) IMAGE PROCESSING APPARATUS, IMAGE PROCESSING METHOD, IMAGE PROCESSING SYSTEM AND RECORDING MEDIUM

(71) Applicant: Konica Minolta, Inc., Tokyo (JP)

(72) Inventor: Ryoichi Watanabe, Hino (JP)

(73) Assignee: KONICA MINOLTA INC., Tokyo (JP)

(*) Notice: Subject to any disclaimer, the term of this patent is extended or adjusted under 35 U.S.C. 154(b) by 465 days.

(21) Appl. No.: 18/179,506

(22) Filed: Mar. 7, 2023

(65) Prior Publication Data
US 2023/0298173 A1 Sep. 21, 2023

(30) Foreign Application Priority Data
Mar. 18, 2022 (JP) .................. 2022-043422

(51) Int. Cl.
G06K 9/00 (2022.01)
G06F 3/14 (2006.01)
G06T 7/00 (2017.01)
G06T 7/20 (2017.01)
(Continued)

(52) U.S. Cl.
CPC .............. G06T 7/0012 (2013.01); G06F 3/14 (2013.01); G06T 7/20 (2013.01); G06T 7/62 (2017.01); G06V 10/25 (2022.01); G06T 2207/10116 (2013.01); G06T 2207/30061 (2013.01)

(58) Field of Classification Search
CPC . G06K 9/00; G06T 7/00; A61B 6/541; G03G 13/054
USPC ........ 382/100, 103, 106–107, 128–132, 154, 382/156, 168, 173, 181, 189, 199, 224, 382/254, 285–291, 305, 312; 378/4, 21, 378/28
See application file for complete search history.

(56) References Cited

U.S. PATENT DOCUMENTS

2020/0194034 A1* 6/2020 Akagi .................. G06T 7/0016
2020/0237184 A1* 7/2020 Shigeta .............. A61B 1/00055
2020/0297240 A1* 9/2020 Shimamura ........... G06T 7/0016
(Continued)

FOREIGN PATENT DOCUMENTS

JP 2019122449 A 7/2019
JP 2020171427 A 10/2020

OTHER PUBLICATIONS

Estimating Total Lung Volume from Pixel-Level Thickness Maps of Chest Radiographs Using Deep Learning Tina Dorosti,1,2,3, Manuel Schultheiß,1,2,3, Philipp Schmette1, Jule Heuchert1,2,3, (Year: 2025).*

Primary Examiner — Seyed H Azarian
(74) Attorney, Agent, or Firm — CANTOR COLBURN LLP

(57) ABSTRACT

An image processing apparatus, including: a hardware processor that obtains a side image of a lung field radiographed from a side of a subject, identifies a first side lung field region and a second side lung field region, from the side image, causes a display to display at least one of the identified first side lung field region and second side lung field region, and calculates at least one of an area of the first side lung field region and an area of the second side lung field region, based on the first side lung field region and/or the second side lung field region; and a changer that is capable of changing at least one side lung field region between the first side lung field region and the second side lung field region through operation by a user.

18 Claims, 7 Drawing Sheets

(51) Int. Cl.
   *G06T 7/62*       (2017.01)
   *G06V 10/25*      (2022.01)

(56) References Cited

U.S. PATENT DOCUMENTS

2020/0327665 A1* 10/2020 Shimamura ............ A61B 6/541
2020/0327689 A1* 10/2020 Tsunomori ............ G06T 7/0012
2021/0052240 A1*  2/2021 Weingarten ............ A61B 6/487

* cited by examiner

IMAGE PROCESSING APPARATUS, IMAGE PROCESSING METHOD, IMAGE PROCESSING SYSTEM AND RECORDING MEDIUM

REFERENCE TO RELATED APPLICATIONS

The present invention claims priority under 35 U.S.C. § 119 to Japanese Application, 2022-043422, filed on Mar. 18, 2022, the entire contents of which being incorporated herein by reference.

TECHNICAL FIELD

The present invention relates to an image processing apparatus, an image processing method, an image processing system and a recording medium.

DESCRIPTION OF THE RELATED ART

Conventionally, BodyBox having a high test cost, such as of installation, the test time period, and disposables for a test, is used for significantly important tests, such as of total lung capacity (TLC) and residual volume (RV), for evaluating the respiratory function of a patient.

Techniques have also been proposed that calculate parameters equivalent to TLC and RV by calculating the volume of the lung field of a patient using an X-ray image analysis apparatus having a lower test cost than BodyBox test (JP 2019-122449A and JP 2020-171427A).

SUMMARY OF THE INVENTION

Unfortunately, the invention described in JP 2019-122449A has no concept of recognizing left and right lung field regions in a side image of the lung field. The invention described in JP 2020-171427A recognizes left and right lung field regions in a side image of the lung field regions only with reference to the diaphragm but does not recognize edges on ventral and dorsal sides. Accordingly, the calculated area accuracies of the left and right lungs are low.

Accordingly, the object of the present invention is to further improve the area accuracies of lung field regions.

To achieve at least one of the abovementioned objects, according to an aspect of the present invention, an image processing apparatus reflecting one aspect of the present invention includes: a hardware processor that obtains a side image of a lung field radiographed from a side of a subject,
  identifies a first side lung field region and a second side lung field region, from the side image,
  causes a display to display at least one of the identified first side lung field region and second side lung field region, and
  calculates at least one of an area of the first side lung field region and an area of the second side lung field region, based on the first side lung field region and/or the second side lung field region; and
  a changer that is capable of changing at least one side lung field region between the first side lung field region and the second side lung field region through operation by a user.

According to an aspect of the present invention, an image processing method reflecting one aspect of the present invention includes: obtaining a side image of a lung field radiographed from a side of a subject;
  region identifying of identifying a first side lung field region and a second side lung field region, from the side image;
  display controlling of causing a display to display at least one of the identified first side lung field region and second side lung field region;
  changing by allowing change of at least one side lung field region between the first side lung field region and the second side lung field region through operation by a user; and
  area calculating of calculating at least one of an area of the first side lung field region and an area of the second side lung field region, based on the first side lung field region and/or the second side lung field region.

According to an aspect of the present invention, an image processing system reflecting one aspect of the present invention includes: a radiographic apparatus that obtains a side image of a lung field by performing radiography from a side of a subject; and an image processing apparatus connected to the radiographic apparatus, the image processing system further including:
  a hardware processor that obtains the side image,
    identifies a first side lung field region and a second side lung field region, from the side image,
    causes a display to display at least one of the identified first side lung field region and second side lung field region, and
    calculates at least one of an area of the first side lung field region and an area of the second side lung field region, based on the first side lung field region and/or the second side lung field region; and
  a changer that is capable of changing at least one side lung field region between the first side lung field region and the second side lung field region through operation by a user.

According to an aspect of the present invention, a recording medium reflecting one aspect of the present invention stores a computer-readable program causes a computer of an image processing apparatus to function as:
  an obtainer that obtains a side image of a lung field radiographed from a side of a subject;
  a region identifier that identifies a first side lung field region and a second side lung field region, from the side image;
  a display controller that causes a display to display at least one of the identified first side lung field region and second side lung field region;
  a changer that is capable of changing at least one side lung field region between the first side lung field region and the second side lung field region through operation by a user; and
  an area calculator that calculates at least one of an area of the first side lung field region and an area of the second side lung field region, based on the first side lung field region and/or the second side lung field region.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Hereinafter, one or more embodiments of the present invention will be described with reference to the drawings. However, the scope of the invention is not limited to the disclosed embodiments.

[Configuration of Image Processing System 100]

First, the configuration of this embodiment is described.

Figure 1:
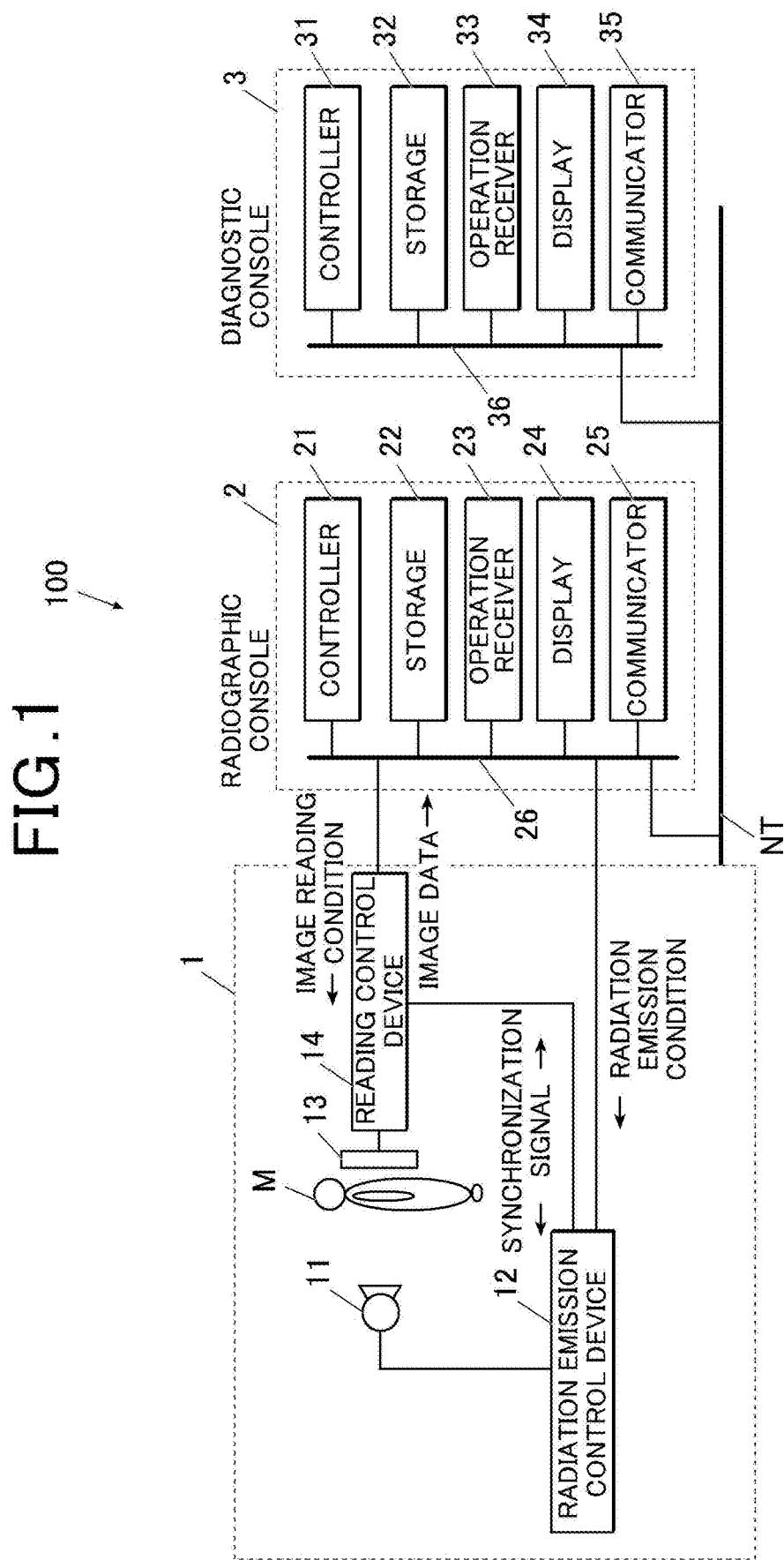
FIG. 1 shows an overall configuration of an image processing system in an embodiment of the present invention.

FIG. 1 shows an overall configuration of an image processing system 100 in this embodiment.

As shown in FIG. 1, the image processing system 100 has a configuration where a radiographic apparatus 1 and a radiographic console 2 are connected to each other by a communication cable or the like, and the radiographic console 2 and a diagnostic console 3 are connected to each other by a communication network NT, such as a LAN (Local Area Network). Each of the devices constituting the image processing system 100 conforms to the DICOM (Digital Image and Communications in Medicine) standard. Communication between the devices is performed in conformity with the DICOM.

[Configuration of Radiographic Apparatus 1]

The radiographic apparatus 1 is, for example, radiographic means for radiographing (dynamically radiographing) the dynamics of a living body, such as morphological changes including expansion and contraction of lungs accompanying respiratory movements, and heartbeats. Dynamic radiography means obtainment of a plurality of images indicating the dynamics of a subject by repeated irradiation of the subject with pulsated radiation, such as X-rays, at predetermined time intervals (pulse irradiation) or by uninterrupted and continuous irradiation at a low dose rate (continuous irradiation). A series of images obtained by dynamic radiography is called a dynamic image (medical image). Each of the images constituting the dynamic image is called a frame image. The dynamic image encompasses a moving image but does not encompass an image obtained by taking a still image while displaying a moving image. Note that in the following embodiment, a case of dynamic radiography of a chest by pulse irradiation is described as an example.

A radiation source 11 is disposed at a position facing a radiation detector 13 with a subject M (test subject) intervening between them and emits radiation (X-rays) to the subject M in accordance with control by a radiation emission control device 12.

The radiation emission control device 12 is connected to the radiographic console 2 and controls the radiation source 11 based on a radiation emission condition input through the radiographic console 2 and performs radiography. The radiation emission condition input through the radiographic console 2 includes, for example, a pulse rate, a pulse width, a pulse interval, the number of radiographic frames per radiograph, the value of X-ray tube current, the value of X-ray tube voltage, and an added filter type. The pulse rate is the number of radiation emissions per second and coincides with the frame rate described later. The pulse width is a radiation emission time period per radiation emission. The pulse interval is a time period from the start of one radiation emission to the start of the next radiation emission, and coincides with a frame interval, described later.

The radiation detector 13 is made up of a semiconductor image sensor, such as an FPD (flat panel detector). The FPD includes, for example, a glass substrate, and a plurality of detection elements (pixels) that are arranged at predetermined positions on the substrate in a matrix manner and detect radiation having been emitted from the radiation source 11 and having passed through at least the subject M, in accordance with its intensity, convert the detected radiation into an electric signal and accumulate the signal. Each pixel has a configuration including a switcher, such as a TFT (thin film transistor), for example. The FPD may be any of an indirect type converting X-rays into an electric signal by a photoelectric conversion element through a scintillator, and a direct type directly converting X-rays into an electric signal. Any of the types may be adopted.

The radiation detector 13 is provided so as to face the radiation source 11 with the subject M intervening between them.

A reading control device 14 is connected to the radiographic console 2. The reading control device 14 controls the switcher of each pixel of the radiation detector 13 based on an image reading condition input through the radiographic console 2 and switches reading of an electric signal accumulated in the corresponding pixel and obtains image data by reading an electric signal accumulated in the radiation detector 13. The image data is a frame image. The pixel signal value of the frame image represents a density value. The reading control device 14 outputs the obtained frame image to the radiographic console 2. The image reading condition includes, for example, the frame rate, frame interval, pixel size, and image size (matrix size). The frame rate is the number of frames obtained per second and coincides with the pulse rate. The frame interval is a time interval from the start of one operation of obtaining a frame image to the start of the next operation of obtaining the next frame image and coincides with the pulse interval.

Here, the radiation emission control device 12 and the reading control device 14 are connected to each other and mutually exchange a synchronization signal, thus synchronizing the radiation emission operation and the image reading operation with each other.

[Configuration of Radiographic Console 2]

The radiographic console 2 outputs the radiation emission condition and the image reading condition to the radiographic apparatus 1 and controls radiography by the radiographic apparatus 1 and the radiograph reading operation, and displays the dynamic image obtained by the radiographic apparatus 1, for confirming positioning by a radiographer, such as a radiograph technician, and confirming whether the image is suitable for diagnosis or not.

As illustrated in FIG. 1, the radiographic console 2 includes a controller 21, a storage 22, an operation receiver 23, a display 24 and a communicator 25, which are connected to each other by a bus 26.

The controller 21 includes a CPU (Central Processing Unit), a RAM (Random Access Memory), and the like. The CPU of the controller 21 reads system programs and various processing programs stored in the storage 22, loads the programs into the RAM in accordance with operation on the operation receiver 23, and executes various processes including an after-mentioned radiography control process in accordance with the loaded programs, thus controlling the operation of each component of the radiographic console 2, the radiation emission operation of the radiographic apparatus 1 and the reading operation in a centralized manner.

The storage 22 includes a nonvolatile semiconductor memory, a hard disk, and the like. The storage 22 stores various programs to be executed by the controller 21, parameters required to execute processes by the programs, or data on processing results, etc. For example, the storage 22 stores a program for executing the radiography control process shown in FIG. 2. The storage 22 stores the radiation emission condition and the image reading condition in association with a test target site (the chest, in this case). The various programs are stored in a form of readable program code. The controller 21 sequentially executes operation in accordance with the program code.

The operation receiver 23 includes a keyboard including cursor keys, numeric input keys, and various function keys; and a pointing device such as a mouse, and outputs an instruction signal input through key operation on the keyboard and mouse operation, to the controller 21. The operation receiver 23 may include a touch panel on a display screen of the display 24. In this case, an instruction signal input through the touch panel is output to the controller 21.

The display 24 is made up of a monitor, such as an LCD (Liquid Crystal Display) or a CRT (Cathode Ray Tube) and displays an input instruction from the operation receiver 23, data and the like, in accordance with the instruction of a display signal input from the controller 21.

The communicator 25 includes an LAN adaptor, a modem, a TA (Terminal Adapter) or the like, and controls data transmission and reception between apparatuses connected by the communication network NT.

[Configuration of Diagnostic Console 3]

The diagnostic console 3 is an image processing apparatus that obtains a dynamic image from the radiographic console 2, applies an image processing to the obtained dynamic image and displays the image, and calculates the area of a lung field and the like.

As illustrated in FIG. 1, the diagnostic console 3 includes a controller 31 (hardware processor), a storage 32, an operation receiver 33, a display 34 and a communicator 35, which are connected to each other by a bus 36.

The controller 31 includes a CPU, a RAM, and the like. The CPU of the controller 31 reads system programs and various processing programs stored in the storage 32, loads the programs into the RAM in accordance with operation on the operation receiver 33, and executes various processes including an after-mentioned report creation process in accordance with the loaded programs, thus controlling the operation of each component of the diagnostic console 3 in a centralized manner. The controller 31 functions as an obtainer, a region identifier, a display controller, an area calculator, a volume calculator, an extractor, a compensator, and a tracker.

The storage 32 includes a nonvolatile semiconductor memory, a hard disk, and the like. The storage 32 stores various programs including programs for executing various processes in the controller 31, parameters required to execute processes by the programs, or data on processing results, etc. These various programs are stored in a form of readable program code. The controller 31 sequentially executes operation in accordance with the program code.

The storage 32 stores previously taken dynamic images, in association with the identification ID, patient information (test subject information; e.g., the patient ID, the name, height, weight, age and gender of the patient (test subject), etc.), test information (e.g., the test ID, test date, test target site (the chest, in this case), respiration state, etc.) and the like.

The operation receiver 33 includes a keyboard including cursor keys, numeric input keys, and various function keys; and a pointing device such as a mouse, and outputs an instruction signal input through key operation on the keyboard and mouse operation by the user, to the controller 31. The operation receiver 33 may include a touch panel on a display screen of the display 34. In this case, an instruction signal input through the touch panel is output to the controller 31.

The display 34 includes an LCD, a CRT or the like, and presents various displays in accordance with the instruction of a display signal input from the controller 31.

The communicator 35 includes an LAN adaptor, a modem, a TA or the like, and controls data transmission and reception between apparatuses connected by the communication network NT.

[Operation of Image Processing System 100]

Next, the operation of the image processing system 100 according to this embodiment is described.

[Operation of Radiographic Apparatus 1 and Radiographic Console 2]

First, radiographic operation of the radiographic apparatus 1 and the radiographic console 2 is described.

Figure 2:
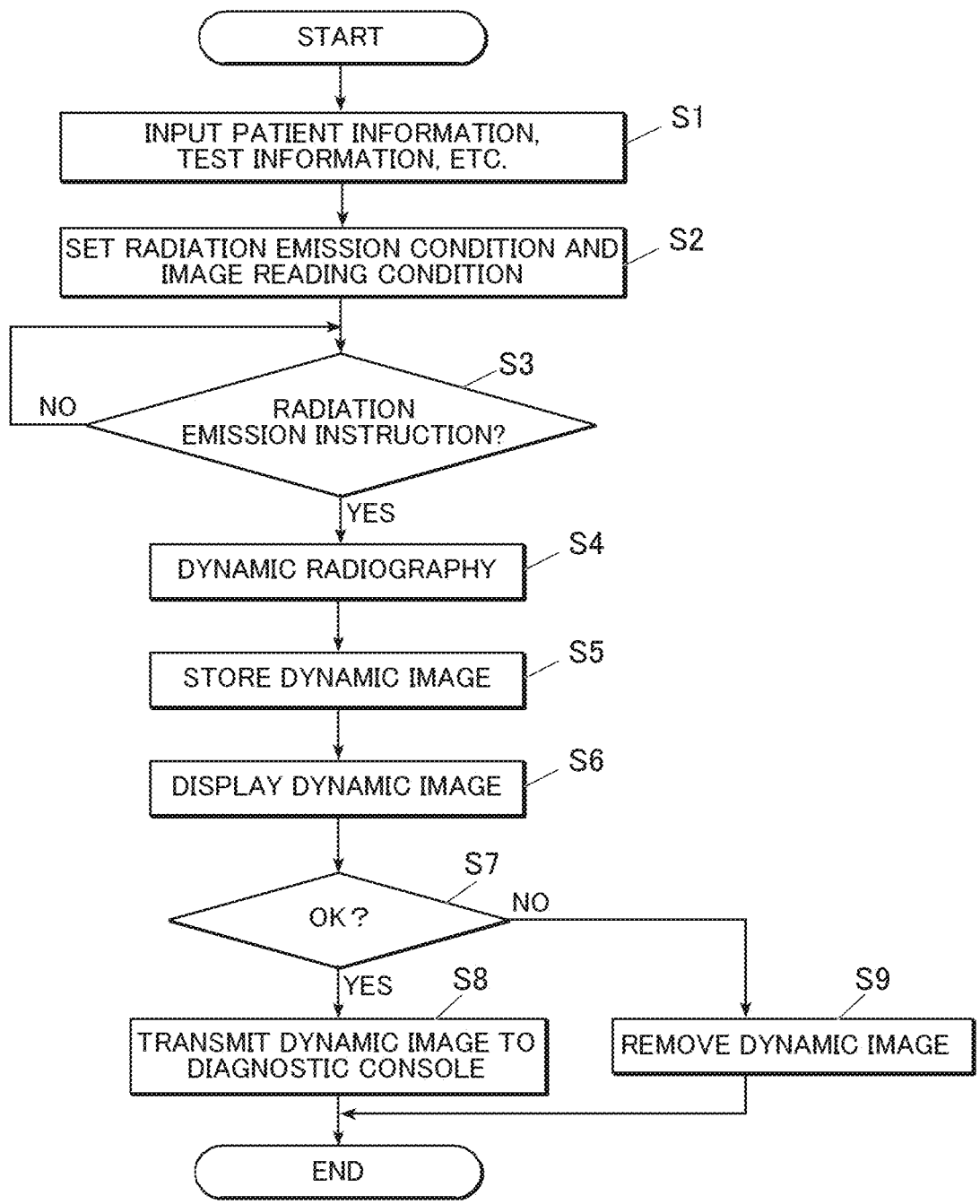
FIG. 2 is a flowchart showing a radiography control process.

FIG. 2 shows a radiography control process executed by the controller 21 of the radiographic console 2. The radiography control process is executed by cooperation between the controller 21 and the programs stored in the storage 22.

First, the operation receiver 23 of the radiographic console 2 is operated by the radiographer (radiology technologist), and the patient information on the test subject (subject M), and the test information are input (Step S1). Note that the patient information and the test information are comprehensively called order information.

Next, the radiation emission condition is read from the storage 22 and is set in the radiation emission control device 12, and the image reading condition is read from the storage 22 and is set in the reading control device 14 (Step S2).

Next, an instruction for emitting radiation issued by the operation receiver 23 is waited for (Step S3). Here, the radiographer disposes the subject M between the radiation source 11 and the radiation detector 13, thus achieving positioning. The test subject (subject M) is instructed to have a respiration state (e.g., eupnea). At a time, point when radiography preparation is made, the operation receiver 23 is operated and a radiation emission instruction is input.

When the radiation emission instruction is input through the operation receiver 23 (Step S3: YES), a radiography start instruction is output to the radiation emission control device 12 and the reading control device 14, and dynamic radiography is started (Step S4). That is, at a pulse interval set in the radiation emission control device 12, radiation is emitted by the radiation source 11, and frame images are taken by the radiation detector 13.

When radiography with a predetermined number of frames is finished, an instruction of finishing radiography is output by the controller 21 to the radiation emission control device 12 and the reading control device 14, and radiographic operation is stopped. The number of taken frames is the number of frames capable of taking at least one respiratory cycle.

The frame images obtained by radiography are sequentially input into the radiographic console 2 and stored in association with the respective numbers (frame numbers) indicating the radiographic orders, in the storage 22 (Step S5), and displayed on the display 24 (Step S6). The radiographer confirms positioning and the like through the displayed dynamic image and determines whether the image suitable for diagnosis is obtained through radiography (radiography OK) or re-radiography is required (radiography NG). The operation receiver 23 is operated and a determination result is input.

If the determination result indicating radiography OK is input by predetermined operation on the operation receiver 23 (Step S7: YES), each of a series of frame images obtained by dynamic radiography is accompanied by an identification ID for identifying the dynamic image, the patient information, the test information, information on the radiation emission condition, the image reading condition, and the number (frame number) indicating the radiographic order (for example, written in the header region of image data in the DICOM format), and transmitted to the diagnostic console 3 through the communicator 25 (Step S8). The processing is then finished. On the other hand, if the determination result indicating radiography NG is input by predetermined operation on the operation receiver 23 (Step S7: NO), the series of frame images stored in the storage 22 is removed (Step S9), and the processing is finished. In this case, re-radiography is required.

[Operation of Diagnostic Console 3]

Figure 3:
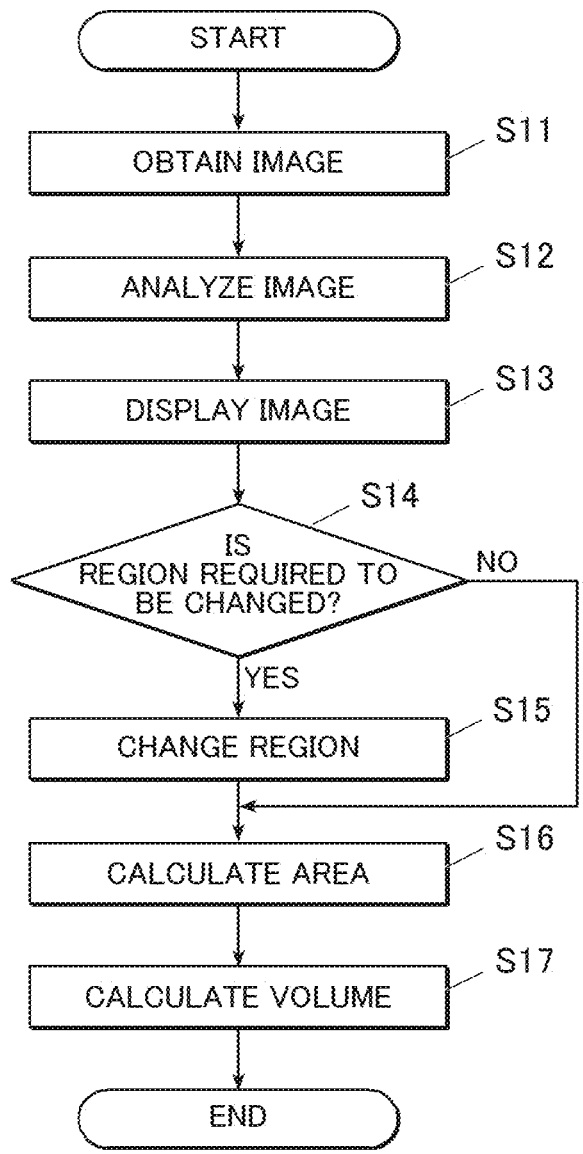
FIG. 3 is a flowchart showing a lung field area and volume calculation process.

Next, operation of analyzing the dynamic image by the diagnostic console 3 is described. The diagnostic console 3 executes a lung field area and volume calculation process shown in FIG. 3 through cooperation between the controller 31 and the programs stored in the storage 32. Hereinafter, referring to FIG. 3, the lung field area and volume calculation process is described.

For U-Net, it is assumed that before the lung field area and volume calculation process, learning of discriminating an overlap region A11 and an entire region A2 (overlap region A11+overlap-eliminated region A12), which are described later, from the series of frame images of a side dynamic image of the lung field, and learning of discriminating a first side lung field region A3 and a second side lung field region A4, which are described later, from the overlap region A11 and the entire region A2 are preliminarily performed.

First, the controller 31 receives (obtains) a series of frame images of the side dynamic image and the front dynamic image of the lung field, from the radiographic console 2 through the communicator 35 (Step S11). The series of frame images of the received dynamic image is stored in the storage 32 in association with the identification ID, the patient information, test information, etc. In this case, the controller 31 functions as an obtainer.

Next, a dynamic image is selected from among the dynamic images (the side dynamic image and the front dynamic image) stored in the storage 32 through the operation receiver 33, and an instruction for lung field area calculation is issued, and subsequently, the controller 31 analyzes the dynamic image selected through the operation receiver 33 (Step S12). Specifically, a lung field region identification process is performed. In this case, the controller 31 functions as a region identifier.

Here, the lung field region identification process performed by the controller 31 is described using the side dynamic image.

Figure 4:
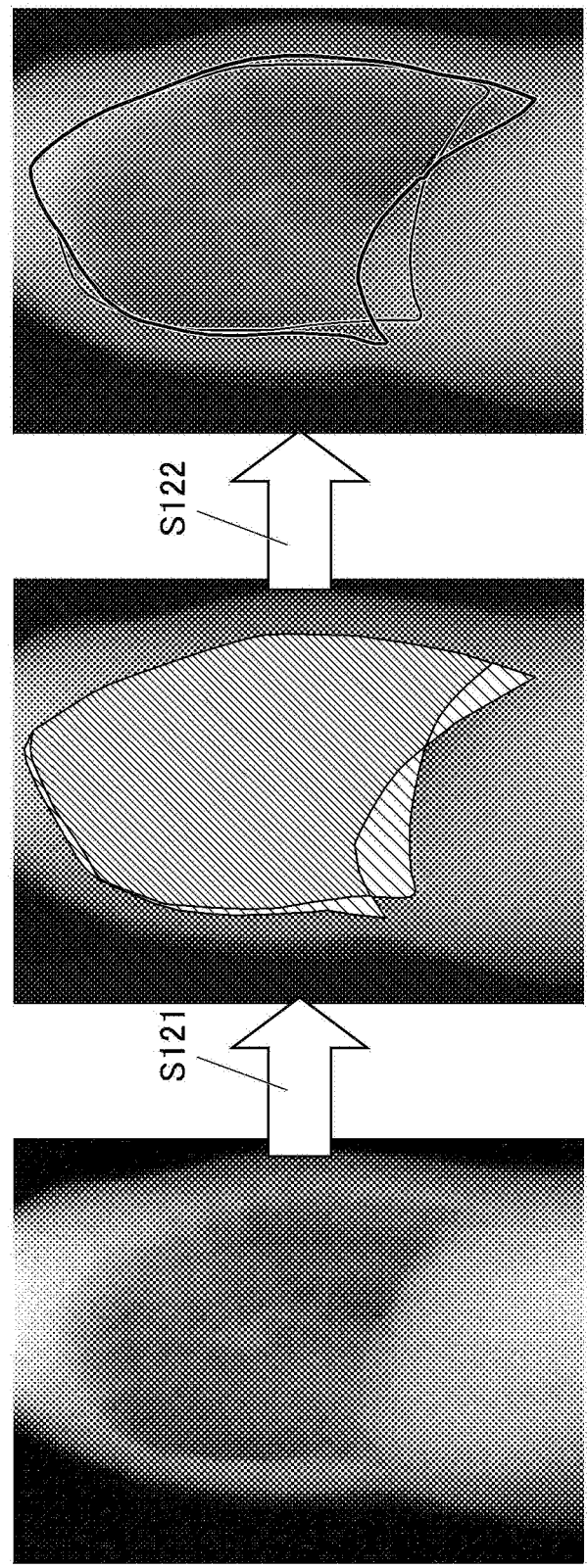
FIG. 4 shows a lung field region extraction process.

FIG. 4 shows a schematic view of the lung field region identification process. As shown in FIG. 4, the lung field region identification process is performed by two steps that are Steps S121 and S122.

Figure 5:
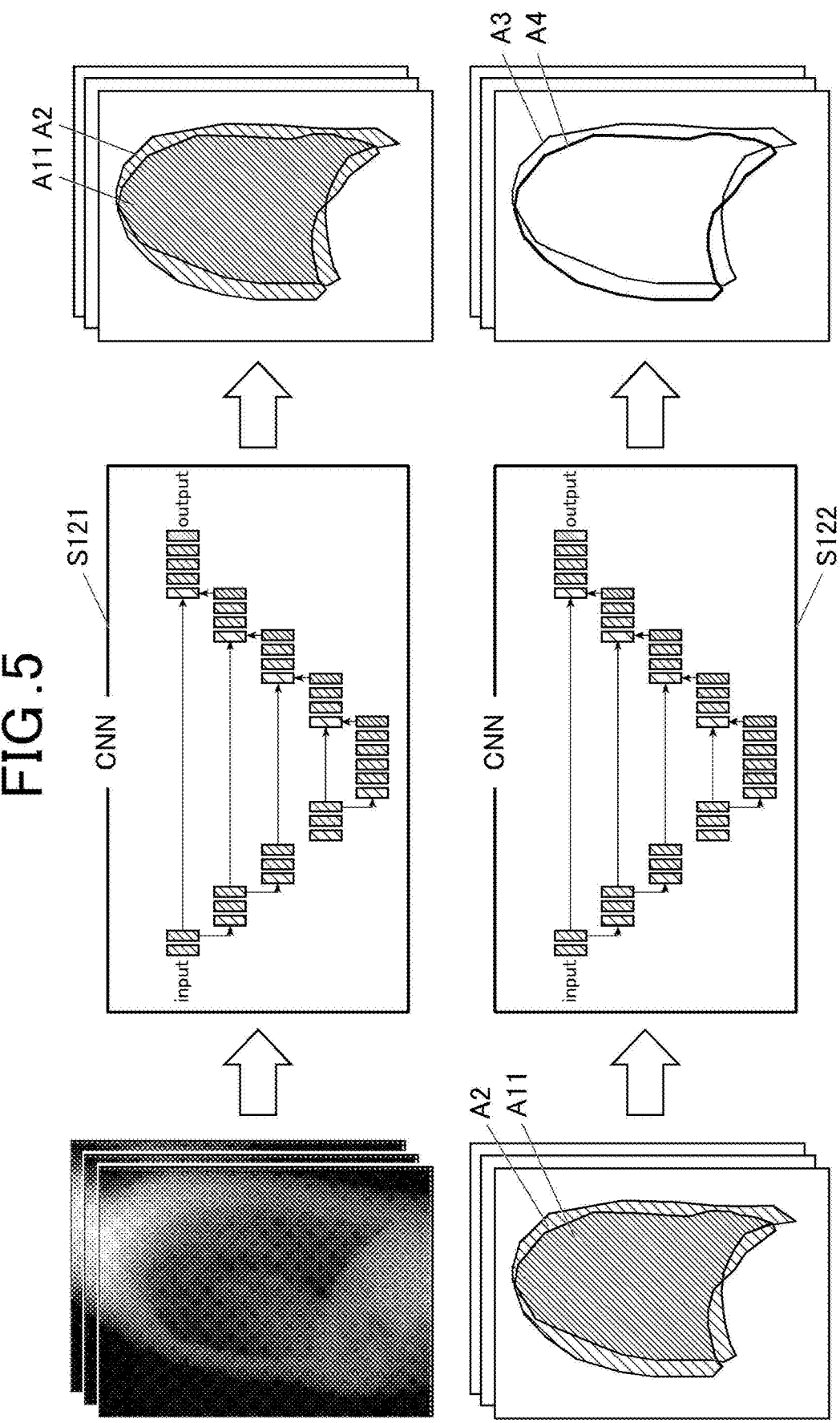
FIG. 5 shows the lung field region extraction process.

First, the controller 31 applies deep learning to the series of frame images of the side dynamic image of the lung field, for example, using CNN (Convolutional Neural Network) as shown in FIG. 5, and the overlap region A11 and the entire region A2 of the lung field region are discriminated (Step S121). An example of CNN may be U-Net.

Figure 6:
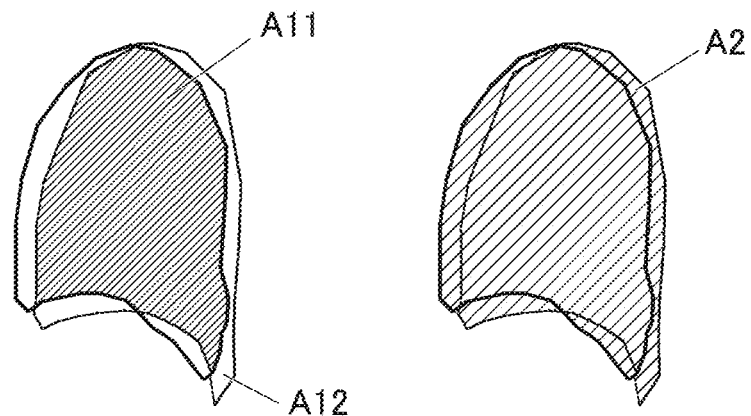
FIG. 6 shows an overlap region, an overlap-eliminated region, and an entire region.

Here, conceptual views of the overlap region A11, the overlap-eliminated region A12 and the entire region A2 are shown in FIG. 6. The overlap region A11 indicates a region where the left and right side lung field regions overlap each other. The overlap-eliminated region A12 indicates a side lung field region including only one of the left and right. The entire region A2 indicates a side lung field region including at least one of the left and right. That is, the entire region A2 is a region where the overlap region A11 and the overlap-eliminated region A12 are integrated.

Next, the controller 31 applies deep learning using U-Net to the overlap region A11 and the entire region A2 determined in Step S121, for example, as shown in FIG. 5, and determines the first side lung field region A3 and the second side lung field region A4 (Step S122). In the side dynamic image of the lung field, the first side lung field region A3 and the second side lung field region A4 respectively indicate the left and right side lung field regions.

Likewise, in the case of using the front dynamic image, the controller 31 determines the front lung field region (the first front lung field region and the second front lung field region).

Returning to the lung field area and volume calculation process, next, the controller 31 displays, on the display 34, at least one of the first side lung field region A3 and the second side lung field region A4, which are the analysis result in Step S12. Specifically, lung field region display, such as a lung field region change screen shown in FIG. 7, discriminating the left and right lung fields from each other, is performed (Step S13). In this case, the controller 31 functions as a display controller.

Note that the controller 31 may display the overlap region A11, the overlap-eliminated region A12 and the entire region A2, on the display 34.

Next, for example, the user, such as a radiographer or a doctor, confirms the lung field regions displayed on the display 34, the controller 31 receives a notification that the region is required to be changed (Step S14: YES) or the region is not required to be changed (Step S14: NO) through the operation receiver 33 (Step S14). If the controller 31 receives the notification that the region is not required to be changed (Step S14: NO), the processing proceeds to Step S16. If the controller 31 receives the notification that the region is required to be changed (Step S14: YES), the processing proceeds to Step S15, in which the region is changed.

Note that the controller 31 may be set so that the region confirmation by the user is unnecessary, and a flow of always executing neither Step S14 nor S15 may be adopted.

Next, the lung field region displayed on the display 34 is changed using the operation receiver 33 by the user, the controller 31 receives a lung field region change result (Step S15). Here, the operation receiver 33 functions as a changer.

Note that the change result may be repeatedly leaned by CNN used for the lung field region identification process.

The change of the lung field region performed by the controller 31 is herein described.

Figure 7:
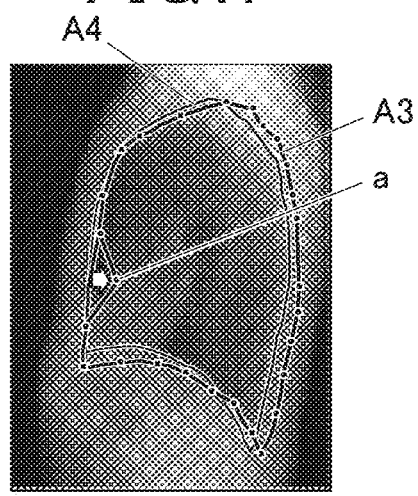
FIG. 7 shows an example of a lung field region change screen.

FIG. 7 shows a change screen displayed on the display 34 when the first side lung field region A3 is changed. The controller 31 arranges a point "a" on a curve in the first side lung field region A3 that is to be changed. The radiographer can move the point "a" using the operation receiver 33. As indicated by a right arrow, the example in FIG. 7 is an example where the point "a" is moved to the inside of the lung field. The first side lung field region A3 is a region where the point "a" is moved to the inside of the lung field.

Returning to the lung field area and volume calculation process, next, the controller 31 calculates at least one side lung field area, based on the finally received region (the first side lung field region A3 and the second side lung field region A4) (Step S16).

Likewise, the controller 31 calculates the front lung field area from the front lung field regions (the first front lung field region and the second front lung field region).

Here, the controller 31 functions as an area calculator.

Note that the area calculation method may be any of methods described in JP 2019-122449A and JP 2020-171427A.

Next, the controller 31 calculates the volume of the lung field (Step S17).

Specifically, the controller 31 calculates the volume of the lung field areas of the first side lung field region A3 and the second side lung field region A4 respectively, based on the front lung field area (the first front lung field region and the second front lung field region) and the side lung field area (the first side lung field region A3 and the second side lung field region A4).

In this case, the controller 31 functions as a volume calculator.

Note that the volume calculation method may be any of methods described in JP 2019-122449A and JP 2020-171427A.

In the above description, the controller 31 functions as the area calculator, and calculates the lung field area from the side dynamic image and the front dynamic image of the lung field. Likewise, the lung field area may be calculated from the side still image and the front still image of the lung field. In this case, the radiographic apparatus 1 functions as radiographic means for taking a still image.

The controller 31 may calculate the mean area of the front of the lung field from the first front lung field region and the second front lung field region. Likewise, the controller 31 may calculate the mean area of the side of the lung field from the first side lung field region A3 and the second side lung field region A4. Note that the volume of the lung field can be calculated based on the area of the lung field region in the front image of the lung field (the area of the first front lung field region, the area of the second front lung field region, and the mean area) and on the area of the lung field region in the side image (the area of the first side lung field region A3, the area of the second side lung field region A4, and the mean area).

In the embodiment described above, the region is changed by moving the point "a" as in the change screen shown in FIG. 7. However, there is no limitation to this.

Figure 8:
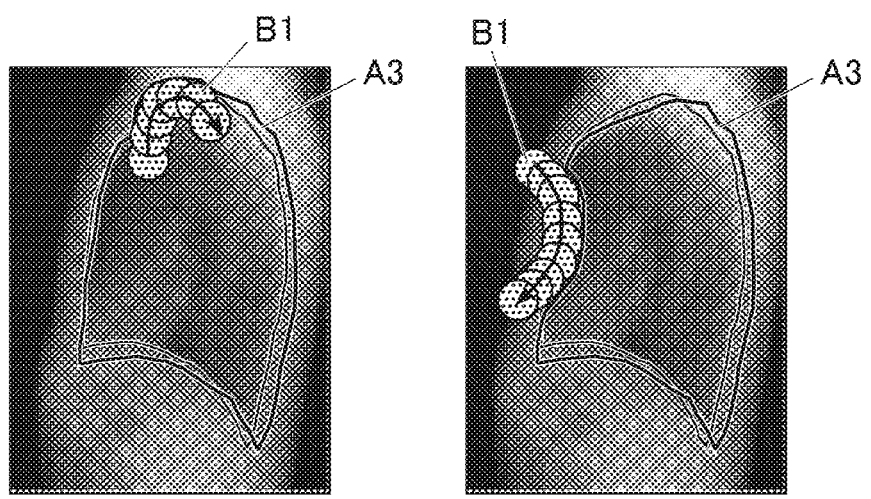
FIG. 8 shows an example of the lung field region change screen.

For example, as shown in FIG. 8, the region can also be changed using a brush tool B1 or the like. As shown in a left diagram of FIG. 8, the first side lung field region A3, which is to be changed, can be changed in a widening direction by moving the brush tool B1 from the inside to the outside. Conversely, as shown in a right diagram of FIG. 8, the first side lung field region A3, which is to be changed, can be changed in a narrowing direction by moving the brush tool B1 from the outside to the inside. Note that use of the circular-shaped brush tool B1 smooths the frame indicating the region. The brush tool B1 does not necessarily have the circular shape and may have a rectangular shape.

Figure 9:
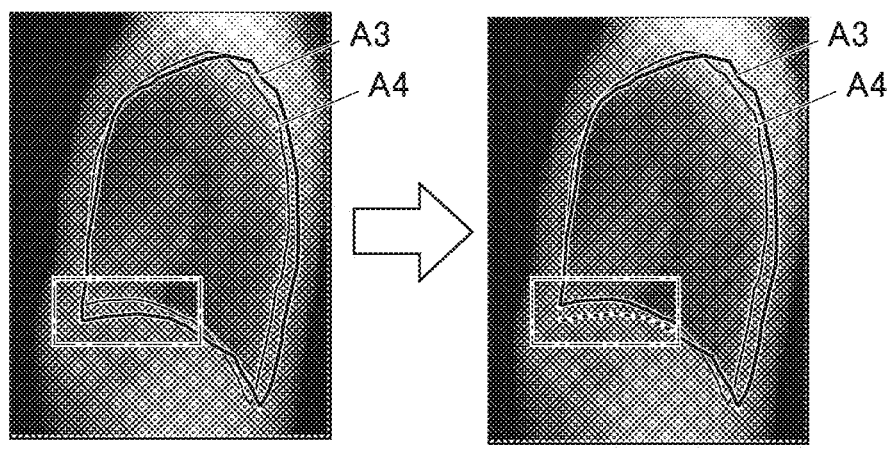
FIG. 9 shows an example of the lung field region change screen.

As shown in FIG. 9, when edges around the diaphragm (a site surrounded by broken lines) in the first side lung field region A3 and the second side lung field region A4 are unclear, the two edges of the first side lung field region A3 and the second side lung field region A4 may overlap each other. Accordingly, the region may be changed by indicating the place to make either one of pieces of region information the same. On the edge around the diaphragm (the site surrounded by broken lines) in the left diagram of FIG. 9, the first side lung field region A3 and the second side lung field region A4 do not overlap each other. Meanwhile, in the right diagram of FIG. 9, change is made so that the second side lung field region A4 can overlap the first side lung field region A3. Note that the broken lines in the right diagram of FIG. 9 indicate the second side lung field region A4 before the region change.

Figure 10:
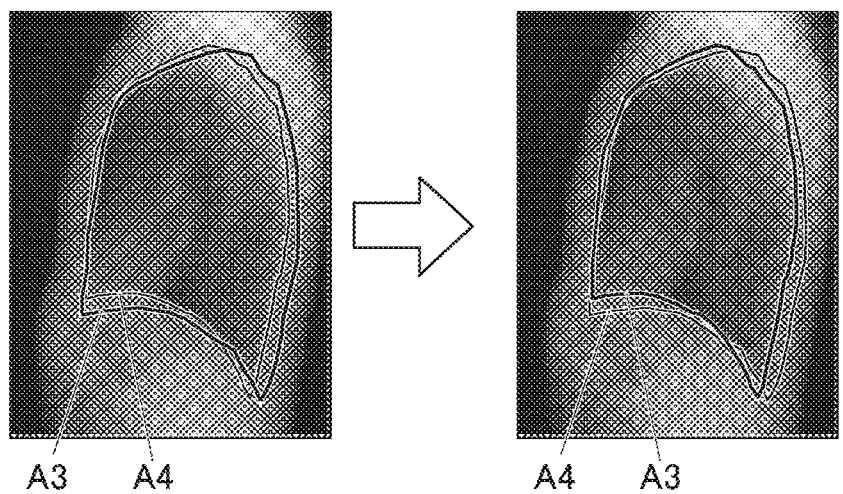
FIG. 10 shows an example of the lung field region change screen.

As shown in FIG. 10, if the controller 31 inversely determines only the edges around the diaphragm in the first side lung field region A3 and the second side lung field region A4, only the edges around the diaphragm in the first side lung field region A3 and the second side lung field region A4 may be inverted. Note that in FIG. 10, the edges around the diaphragm are exemplified. In another example, any edge may be designated and inversely treated.

Figure 11:
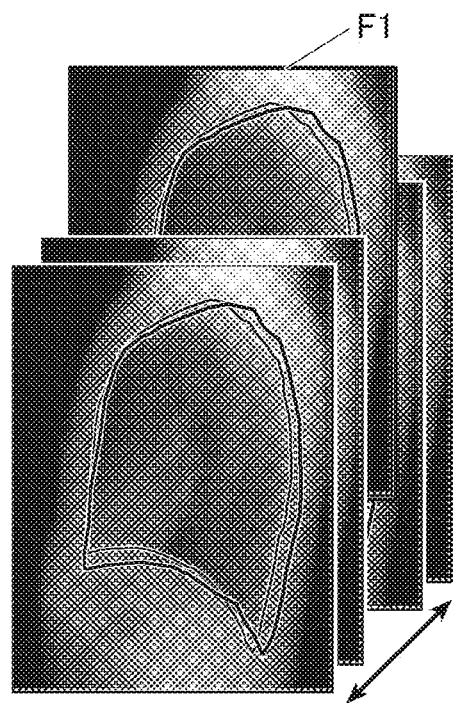
FIG. 11 shows an example of the lung field region change screen.

As shown in FIG. 11, in the case where the analysis target is a dynamic image, a series of frame images is present. When the controller 31 performs region change to a certain frame image F1, it may automatically perform region change also to the other frame images of the series of frame images.

In the case where the analysis target is the dynamic image in case noise or a defect is included in some frame images in the series of frame images, the controller 31 may compensate for the noise or the defect, for example, using the mean value of pixel values, with respect to the frame images before and/or after the frame image including the noise or the defect. In this case, the controller 31 functions as a compensator. Note that in a case of using machine learning for compensating, the controller 31 is required to learn a method of removing the noise or the defect.

The controller 31 may extract a side image where the areas of the first side lung field region A3 and the second side lung field region A4 are the maximum or minimum. In this case, the controller 31 functions as an extractor. Note that the controller 31 may display, on the display 34, the extracted side image with the maximum or minimum.

In the case where the analysis target is the dynamic image, the controller 31 may track the change in area of each frame image for at least one of the areas of the first side lung field region A3 and the second side lung field region A4 and determine the left and right between the first and second, based on the characteristics of the area change. For example, since the heart is at the left lung side, the movements of the left and right lungs are different. In this case, the controller 31 functions as a tracker. Note that use of the machine learning allows setting of automatic determination.

The first side lung field region and the second side lung field region regard the left and right sides as one lung field region. Alternatively, for example, the left and right side lung field regions may be halved into upper and lower parts (upper and inferior lobes) and the respective regions may be identified.

(Advantageous Effects and the Like)

According to the above description, the image processing apparatus (diagnostic console 3) includes: an obtainer (controller 31) that obtains a side image of a lung field radiographed from a side of a subject; a region identifier (controller 31) that identifies a first side lung field region and a second side lung field region, from the side image; a display controller (controller 31) that causes a display to display at least one of the identified first side lung field region and second side lung field region; a changer (operation receiver 33) that is capable of changing at least one side lung field region between the first side lung field region and the second side lung field region through operation by a user; and an area calculator (controller 31) that calculates at least one of an area of the first side lung field region and an area of the second side lung field region, based on the first side lung field region and/or the second side lung field region, which can further improve the area accuracy of the lung field region. That is, the region is automatically set, and subsequently the region is corrected by user operation, which can further improve the area accuracy.

When the region is not changed, the region is automatically set, and the area is automatically calculated. Accordingly, the time and effort for setting the region can be reduced.

The change result is repeatedly subjected to learning by CNN used for the lung field region identification process, thus improving the region identification accuracy, and also improving the area accuracy.

For example, the first side lung field region is the left side lung field region, and the second side lung field region is the right side lung field region.

The obtainer (controller 31) obtains a front image of the lung field radiographed from a front of the subject, the region identifier (controller 31) identifies a front lung field region from the front image, the area calculator (controller 31) calculates an area of the front lung field region, and the image processing apparatus (diagnostic console 3) includes a volume calculator (controller 31) that calculates a volume of the lung field, based on the area of the front lung field region and on at least one area between the area of the first side lung field region and the area of the second side lung field region, thus allowing the area accuracy of the lung field region to be further improved.

The volume calculator (controller 31) calculates a mean area of a side of the lung field, from the area of the first side lung field region and the area of the second side lung field region, and calculates a volume of the lung field, based on the area of the front lung field region and the mean area of the side of the lung field, thus allowing the volume accuracy of the lung field region to be further improved.

The area calculator (controller 31) calculates an area of a first front lung field region and an area of a second front lung field region, based on the front image of the lung field, thus allowing the area accuracy of the lung field region to be further improved in the front image of the lung field as well.

The volume calculator (controller 31) calculates a mean area of a front of the lung field, from the area of the first front lung field region and the area of the second front lung field region, and calculates the volume of the lung field, based on the mean area of the front, thus allowing the volume accuracy of the lung field region to be further improved.

The volume calculator (controller 31) calculates a volume of at least one lung field corresponding to one of the first side lung field region and the second side lung field region, thus allowing the volume accuracy of each lung field region to be further improved.

The area calculator (controller 31) calculates at least one of the area of the first side lung field region and the area of the second side lung field region, based on an overlap-eliminated region where the first side lung field region and the second side lung field region do not overlap each other, in the first side lung field region and the second side lung field region, which can improve the setting accuracy of the lung field region by the deep learning. That is, the overlap-eliminated region is obtained, and then the first side lung field region and the second side lung field region are set, which can improve the setting accuracy of the region.

The region identifier (controller 31) uses machine learning to identify the overlap-eliminated region and obtains the overlap-eliminated region and then sets the region, thus allowing the setting accuracy of the region to be improved.

The area calculator (controller 31) calculates at least one of the area of the first side lung field region and the area of the second side lung field region, based on an overlap region where the first side lung field region and the second side lung field region overlap each other, which can improve the setting accuracy of the lung field region by the deep learning. That is, the overlap region is obtained, and then the first side lung field region and the second side lung field region are set, which can improve the setting accuracy of the region.

The region identifier (controller 31) uses machine learning to identify the overlap region and obtains the overlap region and then sets the region, thus allowing the setting accuracy of the region to be improved.

The obtainer (controller 31) obtains a front dynamic image of the lung field by performing dynamic radiography from a front of the subject and obtains a side dynamic image of the lung field by performing dynamic radiography from the side of the subject, which can use not only the front dynamic image but also the side dynamic image.

The image processing apparatus (diagnostic console 3) includes an extractor (controller 31) that extracts a frame image of the lung field having the area of the first side lung field region and the area of the second side lung field region that are maximum or minimum, from among frame images of the side dynamic image, which can calculate the maximum lung field area, the minimum lung field area, the diaphragm displacement and the like. This can replace the BodyBox test.

The display controller (controller 31) displays the maximum or minimum extracted side image of the lung field extracted by the extractor, thus allowing the radiographer to confirm the maximum lung field area, the minimum lung field area, the diaphragm displacement, and the like on the display 34.

The image processing apparatus (diagnostic console 3) includes a compensator that complements one frame image among the frame images of the side dynamic image, using previous and/or subsequent frame images, which can compensate for noise, or a defect based on the previous and the subsequent frame images even in case the noise or the defect is included.

The image processing apparatus (diagnostic console 3) includes a tracker (controller 31) that tracks at least one of the area of the first side lung field region and the area of the second side lung field region on a frame image basis, which can track the lungs having a large variation in area and the like and easily discriminate the left and right lungs.

The display controller (controller 31) displays the first side lung field region and the second side lung field region on an identical screen, thus allowing the radiographer to confirm the region on the display 34.

The display controller (controller 31) displays an edge of the first side lung field region and an edge of the second side lung field region, thus allowing the radiographer to confirm the edges of the regions on the display 34.

An image processing method includes: obtaining a side image of a lung field radiographed from a side of a subject; region identifying of identifying a first side lung field region and a second side lung field region, from the side image; display controlling of causing a display to display at least one of the identified first side lung field region and second side lung field region; changing by allowing change of at least one side lung field region between the first side lung field region and the second side lung field region through operation by a user; and area calculating of calculating at least one of an area of the first side lung field region and an area of the second side lung field region, based on the first side lung field region and/or the second side lung field region, thus allowing the area accuracy of the lung field region to be further improved.

An image processing system (image processing system 100) includes: a radiographic apparatus that obtains a side image of a lung field by performing radiography from a side of a subject; and an image processing apparatus connected to the radiographic apparatus, the image processing system further including: an obtainer that obtains a side image; a region identifier that identifies a first side lung field region and a second side lung field region, from the side image; a display controller that causes a display to display at least one of the identified first side lung field region and second side lung field region; a changer that is capable of changing at least one side lung field region between the first side lung field region and the second side lung field region through operation by a user; and an area calculator that calculates at least one of an area of the first side lung field region and an area of the second side lung field region, based on the first side lung field region and/or the second side lung field region, thus allowing the area accuracy of the lung field region to be further improved.

A program causes a computer of the image processing apparatus (diagnostic console 3) to function as: an obtainer that obtains a side image of a lung field radiographed from a side of a subject; a region identifier that identifies a first side lung field region and a second side lung field region, from the side image; a display controller that causes a display to display at least one of the identified first side lung field region and second side lung field region; a changer that is capable of changing at least one side lung field region between the first side lung field region and the second side lung field region through operation by a user; and an area calculator that calculates at least one of an area of the first side lung field region and an area of the second side lung field region, based on the first side lung field region and/or the second side lung field region, thus allowing the area accuracy of the lung field region to be further improved.

Note that the description content in the aforementioned embodiment is a preferable example of the present invention. However, the content is not limited to this.

In the above description, the example is disclosed where the hard disk, the semiconductor nonvolatile memory or the like is used as a computer-readable medium for the program according to the present invention. However, there is no limitation to this example. As another computer-readable medium, a portable recording medium, such as a CD-ROM, may be applied. Carrier waves are also applicable as a medium of providing data on the program according to the present invention via a communication line.

Furthermore, detailed configurations and detailed operations of the individual apparatuses that constitute the image processing system can be changed as appropriate within a range not deviating from the spirit of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An image processing apparatus, comprising:
a hardware processor that obtains a side image of a lung field radiographed from a side of a subject,
identifies a first side lung field region and a second side lung field region, from the side image,
causes a display to display at least one of the identified first side lung field region and second side lung field region, and
calculates at least one of an area of the first side lung field region and an area of the second side lung field region, based on the first side lung field region and/or the second side lung field region; and
a changer that is capable of changing at least one side lung field region between the first side lung field region and the second side lung field region through operation by a user,
wherein the hardware processor:
obtains a front image of the lung field radiographed from a front of the subject,
identifies a front lung field region from the front image,
calculates an area of the front lung field region, and
calculates a volume of the lung field, based on the area of the front lung field region and on at least one area between the area of the first side lung field region and the area of the second side lung field region,
wherein the hardware processor calculates a volume of at least one lung field corresponding to one of the first side lung field region and the second side lung field region, and
wherein the hardware processor calculates at least one of the area of the first side lung field region and the area of the second side lung field region, based on an overlap-eliminated region where the first side lung field region and the second side lung field region do not overlap each other, in the first side lung field region and the second side lung field region.

2. The image processing apparatus according to claim 1, wherein the first side lung field region is a left side lung field region, and the second side lung field region is a right side lung field region.

3. The image processing apparatus according to claim 1, wherein the hardware processor calculates a mean area of a side of the lung field, from the area of the first side lung field region and the area of the second side lung field region, and calculates the volume of the lung field, based on the area of the front lung field region and the mean area of the side of the lung field.

4. The image processing apparatus according to claim 1, wherein the hardware processor calculates an area of a first front lung field region and an area of a second front lung field region, based on the front image of the lung field.

5. The image processing apparatus according to claim 4, wherein the hardware processor calculates a mean area of the front of the lung field, from the area of the first front lung field region and the area of the second front lung field region, and calculates the volume of the lung field, based on the mean area of the front.

6. The image processing apparatus according to claim 1, wherein the hardware processor uses machine learning to identify the overlap-eliminated region.

7. The image processing apparatus according to claim 1, wherein the hardware processor calculates at least one of the area of the first side lung field region and the area of the second side lung field region, based on an overlap region where the first side lung field region and the second side lung field region overlap each other.

8. The image processing apparatus according to claim 7, wherein the hardware processor uses machine learning to identify the overlap region.

9. The image processing apparatus according to claim 1, wherein the hardware processor obtains a front dynamic image of the lung field by performing dynamic radiography from a front of the subject and obtains a side dynamic image of the lung field by performing dynamic radiography from the side of the subject.

10. The image processing apparatus according to claim 9, wherein the hardware processor extracts a frame image of the lung field having the area of the first side lung field region and the area of the second side lung field region that are maximum or minimum, from among frame images of the side dynamic image.

11. The image processing apparatus according to claim 10, wherein the hardware processor displays the maximum or minimum extracted side image of the lung field.

12. The image processing apparatus according to claim 9, wherein the hardware processor complements one frame image among the frame images of the side dynamic image, using previous and/or subsequent frame images.

13. The image processing apparatus according to claim 9, wherein the hardware processor tracks at least one of the area of the first side lung field region and the area of the second side lung field region on a frame image basis.

14. The image processing apparatus according to claim 1, wherein the hardware processor displays the first side lung field region and the second side lung field region on an identical screen.

15. The image processing apparatus according to claim 1, wherein the hardware processor displays an edge of the first side lung field region and an edge of the second side lung field region.

16. An image processing method, comprising:
obtaining a side image of a lung field radiographed from a side of a subject;
region identifying of identifying a first side lung field region and a second side lung field region, from the side image;
display controlling of causing a display to display at least one of the identified first side lung field region and second side lung field region;
changing by allowing change of at least one side lung field region between the first side lung field region and the second side lung field region through operation by a user; and
area calculating of calculating at least one of an area of the first side lung field region and an area of the second side lung field region, based on the first side lung field region and/or the second side lung field region,
wherein the method further comprises:
obtaining a front image of the lung field radiographed from a front of the subject,
identifying a front lung field region from the front image,
calculating an area of the front lung field region, and
calculating a volume of the lung field, based on the area of the front lung field region and on at least one area between the area of the first side lung field region and the area of the second side lung field region,
calculating a volume of at least one lung field corresponding to one of the first side lung field region and the second side lung field region, and
calculating at least one of the area of the first side lung field region and the area of the second side lung field region, based on an overlap-eliminated region where the first side lung field region and the second side lung field region do not overlap each other, in the first side lung field region and the second side lung field region.

17. An image processing system comprising: a radiographic apparatus that obtains a side image of a lung field by performing radiography from a side of a subject; and an image processing apparatus connected to the radiographic apparatus, the image processing system further comprising:
a hardware processor that obtains the side image,
identifies a first side lung field region and a second side lung field region, from the side image,
causes a display to display at least one of the identified first side lung field region and second side lung field region, and
calculates at least one of an area of the first side lung field region and an area of the second side lung field region, based on the first side lung field region and/or the second side lung field region; and
a changer that is capable of changing at least one side lung field region between the first side lung field region and the second side lung field region through operation by a user,
wherein the hardware processor further:
obtains a front image of the lung field radiographed from a front of the subject,
identifies a front lung field region from the front image,
calculates an area of the front lung field region, and
calculates a volume of the lung field, based on the area of the front lung field region and on at least one area between the area of the first side lung field region and the area of the second side lung field region,
wherein the hardware processor calculates a volume of at least one lung field corresponding to one of the first side lung field region and the second side lung field region, and
wherein the hardware processor calculates at least one of the area of the first side lung field region and the area of the second side lung field region, based on an overlap-eliminated region where the first side lung field region and the second side lung field region do not overlap each other, in the first side lung field region and the second side lung field region.

18. A non-transitory recording medium storing a computer-readable program causing a hardware processor computer of an image processing apparatus to function as:
an obtainer that obtains a side image of a lung field radiographed from a side of a subject;
a region identifier that identifies a first side lung field region and a second side lung field region, from the side image;
a display controller that causes a display to display at least one of the identified first side lung field region and second side lung field region;

a changer that is capable of changing at least one side lung field region between the first side lung field region and the second side lung field region through operation by a user; and an area calculator that calculates at least one of an area of the first side lung field region and an area of the second side lung field region, based on the first side lung field region and/or the second side lung field region, wherein the hardware processor:

obtains a front image of the lung field radiographed from a front of the subject, identifies a front lung field region from the front image, calculates an area of the front lung field region, and calculates a volume of the lung field, based on the area of the front lung field region and on at least one area between the area of the first side lung field region and the area of the second side lung field region, wherein the hardware processor calculates a volume of at least one lung field corresponding to one of the first side lung field region and the second side lung field region, and wherein the hardware processor calculates at least one of the area of the first side lung field region and the area of the second side lung field region, based on an overlap-eliminated region where the first side lung field region and the second side lung field region do not overlap each other, in the first side lung field region and the second side lung field region.

* * * * *